US007984156B2

(12) United States Patent
Gauthier et al.

(10) Patent No.: US 7,984,156 B2
(45) Date of Patent: Jul. 19, 2011

(54) DATA CENTER SCHEDULER

(75) Inventors: David Gauthier, Seattle, WA (US);
James R Hamilton, Bellevue, WA (US);
Heather E. Warncke, Seattle, WA (US);
Tina Stewart, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/946,593

(22) Filed: Nov. 15, 2010

(65) Prior Publication Data
US 2011/0066728 A1    Mar. 17, 2011

Related U.S. Application Data

(63) Continuation of application No. 12/163,161, filed on Jun. 27, 2008, now Pat. No. 7,860,973.

(51) Int. Cl.
G06F 15/173 (2006.01)
(52) U.S. Cl. ........ 709/226; 709/201; 709/217; 709/221; 709/224; 709/231; 709/232; 709/239; 709/241; 709/244
(58) Field of Classification Search .......... 709/201, 709/217, 223, 227, 231, 232, 246, 203, 224, 709/225, 226, 221, 239, 241, 244
See application file for complete search history.

(56) References Cited

U.S. PATENT DOCUMENTS

| | | | |
|---|---|---|---|
| 5,958,016 A | 9/1999 | Chang et al. | |
| 6,253,241 B1 | 6/2001 | Chaddha | |
| 6,516,350 B1 | 2/2003 | Lumelsky et al. | |
| 6,615,258 B1 | 9/2003 | Barry et al. | |
| 6,631,411 B1 | 10/2003 | Welter et al. | |
| 6,785,704 B1 | 8/2004 | McCanne | |
| 7,155,380 B2 | 12/2006 | Hunt et al. | |
| 7,200,589 B1 | 4/2007 | Graupner | |
| 7,213,065 B2 | 5/2007 | Watt | |
| 7,320,131 B1 | 1/2008 | O'Toole, Jr. | |
| 7,421,695 B2 | 9/2008 | Murray et al. | |
| 7,475,160 B1 | 1/2009 | Shah et al. | |
| 7,483,984 B1 | 1/2009 | Jonker et al. | |
| 7,590,746 B2 | 9/2009 | Slater et al. | |
| 7,600,014 B2 | 10/2009 | Russell et al. | |
| 7,627,658 B2 | 12/2009 | Levett et al. | |
| 7,698,146 B2 | 4/2010 | Cullen, III | |
| 7,860,973 B2 * | 12/2010 | Gauthier et al. | 709/226 |

(Continued)

OTHER PUBLICATIONS

Chandra, et al., "Dynamic Resource Allocation for Shared Data Centers Using Online Measurements", available at least as early as Jul. 4, 2007, at <<http://bcr2.uwaterloo.ca/~brecht/servers/readings-new/chandra-iwqos-2003.pdf>>, pp. 22.

(Continued)

Primary Examiner — Michael Won
(74) Attorney, Agent, or Firm — Lee & Hayes, PLLC

(57) ABSTRACT

An exemplary data stream includes value information for use by consumers of global computing resources in making requests for global computing resources. An exemplary method includes receiving information about data center resources from one or more data centers, based at least in part on the information estimating value information for consumption of computing resources of the one or more data centers and streaming the value information via a network. An exemplary medium or media includes instructions to instruct a computing device to receive, from a data stream, value information for computing resources of one or more data centers, to format the value information for display and to issue requests for consumption of at least some of the computing resources. Other methods, devices and systems are also disclosed.

13 Claims, 10 Drawing Sheets

U.S. PATENT DOCUMENTS

| | | |
|---|---|---|
| 2001/0032262 A1 | 10/2001 | Sundqvist et al. |
| 2002/0120727 A1 | 8/2002 | Curley et al. |
| 2002/0129123 A1 | 9/2002 | Johnson et al. |
| 2003/0115244 A1 | 6/2003 | Molloy et al. |
| 2003/0145080 A1 | 7/2003 | Breese et al. |
| 2003/0149685 A1 | 8/2003 | Trossman et al. |
| 2004/0010544 A1 | 1/2004 | Slater et al. |
| 2004/0073673 A1 | 4/2004 | Santos et al. |
| 2004/0116115 A1 | 6/2004 | Ertel |
| 2004/0193476 A1 | 9/2004 | Aerdts |
| 2004/0267897 A1 | 12/2004 | Hill et al. |
| 2005/0004929 A1 | 1/2005 | Stephenson |
| 2005/0131773 A1 | 6/2005 | Daur et al. |
| 2005/0251572 A1 | 11/2005 | McMahan et al. |
| 2006/0059265 A1 | 3/2006 | Keronen |
| 2006/0149652 A1 | 7/2006 | Fellenstein et al. |
| 2006/0218278 A1 | 9/2006 | Uyama et al. |
| 2006/0250977 A1 | 11/2006 | Gao et al. |
| 2007/0027973 A1 | 2/2007 | Stein et al. |
| 2007/0143767 A1 | 6/2007 | Attanasio et al. |
| 2007/0180020 A1 | 8/2007 | Woods |
| 2007/0260723 A1 | 11/2007 | Cohen et al. |
| 2008/0031136 A1 | 2/2008 | Gavette et al. |
| 2008/0155015 A1 | 6/2008 | Jensen et al. |
| 2009/0177760 A1 | 7/2009 | Gonzalez et al. |
| 2009/0180430 A1 | 7/2009 | Fadell |
| 2010/0169490 A1* | 7/2010 | McNair ........................ 709/226 |
| 2011/0066728 A1* | 3/2011 | Gauthier et al. .............. 709/226 |

OTHER PUBLICATIONS

Chandra, et al., "Effectiveness of Dynamic Resource Allocation for Handling Internet Flash Crowds", available at least as early as Jul. 4, 2007, at <<http://lass.cs.umass.edu/papers/pdf/TR03-37.pdf>>, pp. 16.

Thimm, "Sizing Considerations for Enterprise Applications in Dynamic Data Centre Environments", available at least as early as Jul. 4, 2007, at <<http://www.aifb.uni-karlsruhe.de/Forschungsgruppen/BIK/wi2007/papers/wi-2007-2-007.pdf>>, pp. 107-126.

Xu, et al., "Predictive Control for Dynamic Resource Allocation in Enterprise Data Centers", at <<http://www.hpl.hp.com/techreports/2005/HPL-2005-194R1.pdf>>, IEEE, Jan. 23, 2006, pp. 13.

* cited by examiner

DATA CENTER SCHEDULER

This application is a continuation of prior pending U.S. patent application Ser. No. 12/163,161, filed Jun. 27, 2008, which is herein incorporated by reference in its entirety.

BACKGROUND

Large scale data centers and the Internet provide a global infrastructure for a wide variety of web-based services. Managers of such services aim to ensure excellent quality at reasonable costs. To achieve these goals, a manager of a web-based service typically enters negotiations with one or more data center operators. For example, to ensure excellent quality, a web-service may require a certain amount of memory, CPU and bandwidth. A data center operator may base the purchase price of such resources on a long-term model that accounts for sunk costs, power costs, expected demand for resources, etc. Such negotiations may take considerable time and have lengthy terms. In turn, the lengthy terms bind the resources and make overall operation of the global infrastructure inflexible, fraught with risk and market inefficiencies.

As described herein, various exemplary technologies allow for optimal provisioning of global computing resources. Such technologies can also drive out market inefficiencies and account for associated traffic and events that impact availability and cost of computing resources.

SUMMARY

An exemplary data stream includes value information for use by consumers of global computing resources in making requests for global computing resources. An exemplary method includes receiving information from one or more data centers, based at least in part on the information, estimating value information for consumption of the computing resources and streaming the value information via a network. An exemplary medium or media includes instructions to instruct a computing device to receive, from a data stream, value information for computing resources of one or more data centers, to format the value information for display and to issue requests for consumption of at least some of the computing resources. Other methods, devices and systems are also disclosed.

DESCRIPTION OF DRAWINGS

Non-limiting and non-exhaustive examples are described with reference to the following figures.

DETAILED DESCRIPTION

Various exemplary methods, devices and systems described herein pertain to streaming data that can assist in resource provisioning. A data stream can carry any of a variety of metrics associated with resource provisioning. For example, a data stream can include a value metric (i.e., value information) for a particular resource that can be used to make decisions about that resource. While various examples refer to price information, metrics other than price may be used, additionally or alternatively (e.g., a monetized unit of capacity, a unit based on type of capacity such as guaranteed bandwidth or best case delivery, etc.). As described herein, a data stream may be viewed as somewhat analogous to a stock ticker that streams price information for stocks traded on a stock exchange; noting that where derivatives are available, a ticker may stream prices for derivatives as well. In the context of computing resources, an exemplary data stream can carry information as to past, present and/or future values of computing resources. For example, past values may be used to benchmark, present values for near real-time resource provisioning and future values for resource provisioning to meet future resource needs. As explained, at present, purchases of global computing resources typically occur via infrequent negotiations between a data center operator and a manager of a web-based service or application. Various exemplary techniques described herein allow for more incremental and/or frequent purchases of computing resources. Such techniques can make the market for computing resources more efficient, which can benefit all players (e.g., users, web-based service/app managers, data center operators, etc.).

Figure 1:
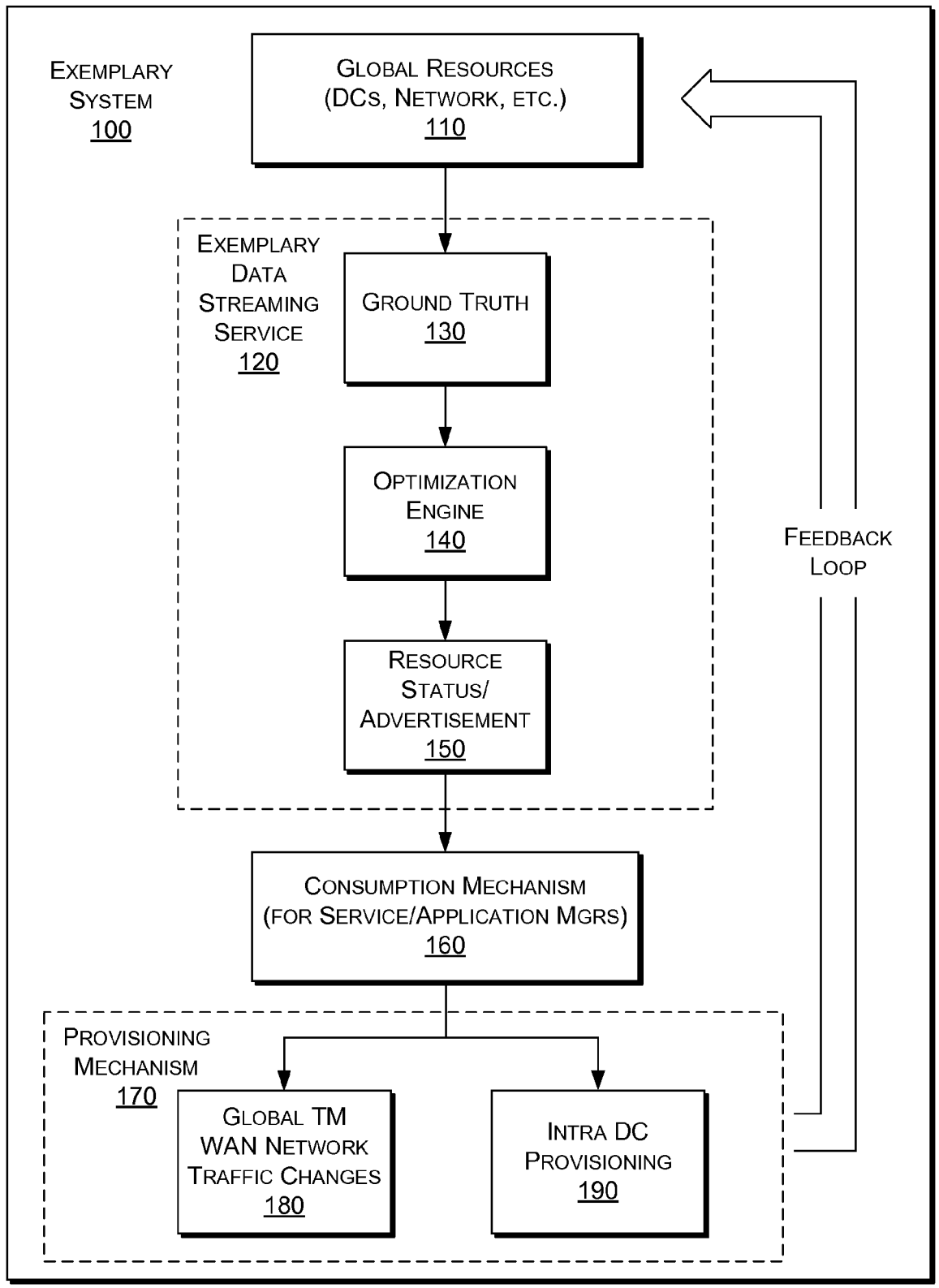
FIG. 1 is a diagram of an exemplary system that includes a service to aid provisioning of global resources.

FIG. 1 shows an exemplary system 100 that includes global resources 110, an exemplary data streaming service 120 that outputs data, a consumption mechanism 160 to consume the data and a provisioning mechanism 170 to provision at least some of the global resources 110 in response to requests. As described herein, a web-based service or web application manager can make such requests based at least in part on consumed data. As shown in FIG. 1, resource provisioning creates a feedback loop such that changes that occur through resource provisioning are continuously accounted for by the exemplary data streaming service 120. In such a manner, the data streaming service 120 can provide timely information as to cost and availability of at least some of the global resources 110. The data stream output by the service 120 may be considered an advertisement stream that advertises various aspects of resources such as time availability, quantity, cost, etc.

The exemplary data streaming service 120 includes modules 130, 140 and 150. The module 130 is labeled "ground truth" as it acquires "raw" data about at least some of the global resources 110. For example, the module 130 may acquire information from a data center as to the number of blades, the amount of memory per blade, the availability of the memory for the next two months, the bandwidth of communications links to the data center, the cost of power to the data center, the geographical location of the data center, etc.

The module 140 is an optimization engine that transforms the raw data to meaningful information using one or more algorithms. Such algorithms may be learning algorithms that can receive input related to trends in computing, measured or prospective benchmarks for equipment, trends in demand for resources (e.g., night, day, geographic, time of week, etc.), etc. In turn, the module 140 can output a variety of information relevant to current and possible future states of the resources. The module 140 can also include value information such as pricing information, for example, that assigns a price to a resource based on time, quantity, location, etc.

The module 150 receives information from the optimization engine 140 and then transforms the information to a standard form relevant to prospective purchasers, for example, the module 150 may operate according to a general schema that specifies resource type, quantity, value (e.g., price), availability, etc.

As mentioned, the consumption mechanism 160 consumes the data output by the service 120 (e.g., a consumer). This consumption mechanism 160 allows computing devices (e.g., automatically or by manual operation by managers or buyers of resources) to readily make requests or place bids for resources. These requests are sent to the provisioning mechanism 170, which includes a Traffic Management (TM) component 180 and an intra data center provisioning component 190. An example of a TM component 180 is described in more detail with respect to FIG. 8. The TM component 180 accounts for network traffic as a data center may have resources but insufficient bandwidth to allow those resources to be used in a particular manner. Further, as described with respect to FIG. 9, an adverse event (or planned event) may occur that affects the global resources. For example, an earthquake may render a data center inoperable and in turn may cause traffic management issues. In response, an exemplary service streams data that reflects such events and can optionally price resources accordingly. A TM component 180 may rely on such a data stream to manage global traffic and such information may also be used by one or more data centers for intra data center provisioning (e.g., per component 190).

As described herein, an exemplary data streaming service receives inputs, analyzes the inputs and streams advertisements that allow others to make strategic decisions as to managing, scheduling, purchasing, etc., resources. Such a service promotes efficient markets for global computing resources and, in turn, promotes efficiency of the global computing system or "cloud". The inputs can be any of a variety of inputs including, but not limited to, electrical capacity, electrical redundancy, cooling capacity, temperature thresholds, physical limitations (e.g., as to network ports), logical limitations (e.g., as to active directory authentications), etc. While inputs may be typically provided by one or more data centers, other global resources may also provide inputs. Such other resources that can provide inputs include, for example, DNS equipment, satellite equipment, fiber optic equipment, weather monitoring equipment, power generation equipment, etc. With respect to networking, inputs may pertain to network availability, bandwidth at access, core and edge layers, BGP routing, QoS, peering price, etc.

Figure 2:
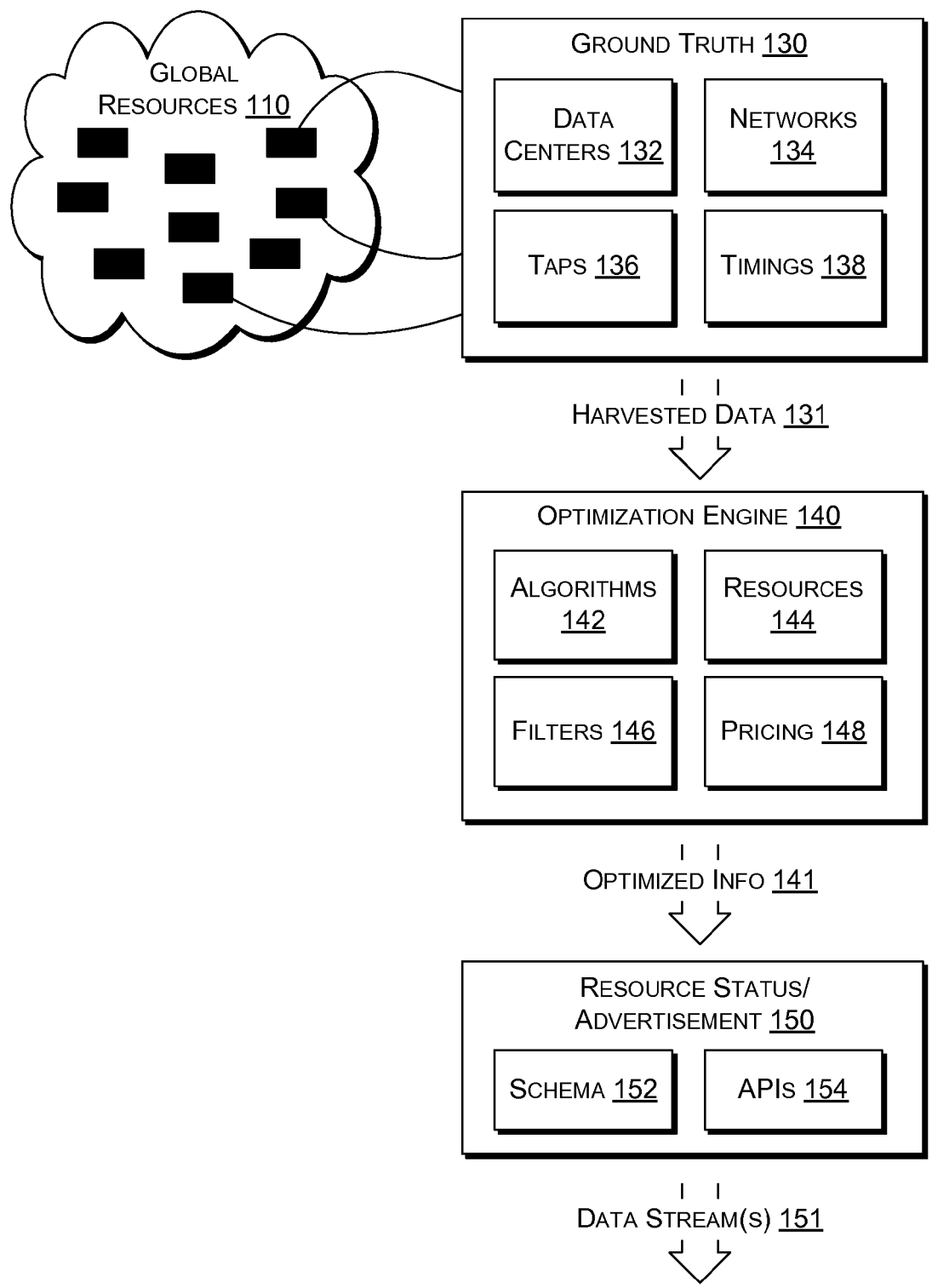
FIG. 2 is a diagram of a portion of the exemplary system of FIG. 1 that shows additional details as to flow of information.

FIG. 2 shows the ground truth component 130, the optimization engine component 140 and the resource status/advertisement component 150 of the service 120 of FIG. 1. The ground truth component 130 includes various modules such as a data centers module 132 (which may be a table of data centers and basic information about these data centers), a networks module 134 (which may maintain information about global and/or local networks), a taps module 136 (e.g., to "tap" into information about a data center or other resources) and a timings module 138 (e.g., that maintains a time table for how often information should be acquired from a particular resource).

With respect to the taps module 136, one may expect that a standardized communication interface and standardized set of data may not exist globally. The taps module 136 can account for such lack of standards by ensuring that every resource has some interface or other mechanism to provide data. In an alternative example, the service 120 sets a standard for resources and receives input from those resources that comply with the standard.

With respect to the timings module 138, the timings for tapping information may be unique to a particular resource or standardized across resources and suitably multiplexed for ease of acquisition. For example, a large data center that serves a diverse set of web-based applications may have a timing frequency of once a minute whereas a small data center that serves a single web-based application may have a timing frequency of about once an hour. Alternatively, both data centers may be tapped at the same frequency.

As shown in FIG. 2, the ground truth component 130 outputs harvested data 131. The harvested data 131 may be in a "raw" form and optionally include some added metadata. The optimization engine component 140 receives the harvested data 131. The optimization engine component 140 includes an algorithms module 142, a resources module 144, a filters module 146 and a pricing module 148. The algorithms module 142 can estimate prices for resources based at least in part on the harvested data 131. In particular, the algorithms module 142 can estimate pricing for one resource relative to one or more other resources. As described herein, this is referred to as relative pricing. Such relative pricing may rely on historical data, trends in computing, trends in demand, etc. At present, such pricing is determined by operators of individual or controlled groups of data centers. Such pricing is typically inefficient and may be less than optimal for both the operator of a data center(s) and consumers of data center resources. Further, such pricing information is typically "stale" as it usually pertains to a negotiated contract for resources, where such a negotiation may take place infrequently (e.g., once a year). In contrast, the optimization engine component 140 can provide frequent pricing estimates that can benefit both operators and consumers. Indeed, frequent estimation of pricing can benefit operators that provide advantages vis-a-vis their competitors. As described herein, optimized information 141 output by the optimization engine component 140 typically includes relative pricing information.

The resource status/advertisement component 150 receives the optimized information 141 as output by the optimization engine component 140. The resource status/advertisement component 150 includes a schema module 152 and APIs 154. The schema module 152 dictates the schema or schemas by which data is streamed to the world per data stream(s) 151. For example, the information may be broadcast via satellite, fiber cable, etc. The data stream(s) 151 may be broadcast from more than one site to ensure ready access and to provide redundancy. In general, the service 120 streams information in a manner whereby no consumer (whether automated or manually operated) can gain advantage by getting the information "sooner" than another consumer. With respect to the APIs 154, such APIs are available to allow consumers to subscribe to the service 120. For example, a consumer may register with the service akin to how a consumer would subscribe to a news service (e.g., The Bloomberg News Service, AP, etc.). The data stream 151 may be continuous or broadcast at pre-determined times (e.g., on-the-hour). An exemplary data stream may be looped and information may be ordered according to location, alphabetical or numeric code, type of resource(s), etc. For example, information about a data center in Chicago may appear just after information about a data center in Beijing. As described herein, a data stream may include information clustered in any of a variety of manners (e.g., data center clusters, memory/CPU clusters, bandwidth/route clusters, etc.).

As described herein, the streamed data may be encoded, compressed and/or encrypted. The streamed data may require specialized hardware and/or specialized software for ready consumption. Such techniques are typically found in set-top boxes for cable television services and some news services. A subscriber may have various privileges based on a fee schedule where a higher fee corresponds to more privileges, which may include rich information as to future trends in estimated pricing. Other value-added features for subscribers may include enhanced software for deep analysis of streamed data.

Figure 3:
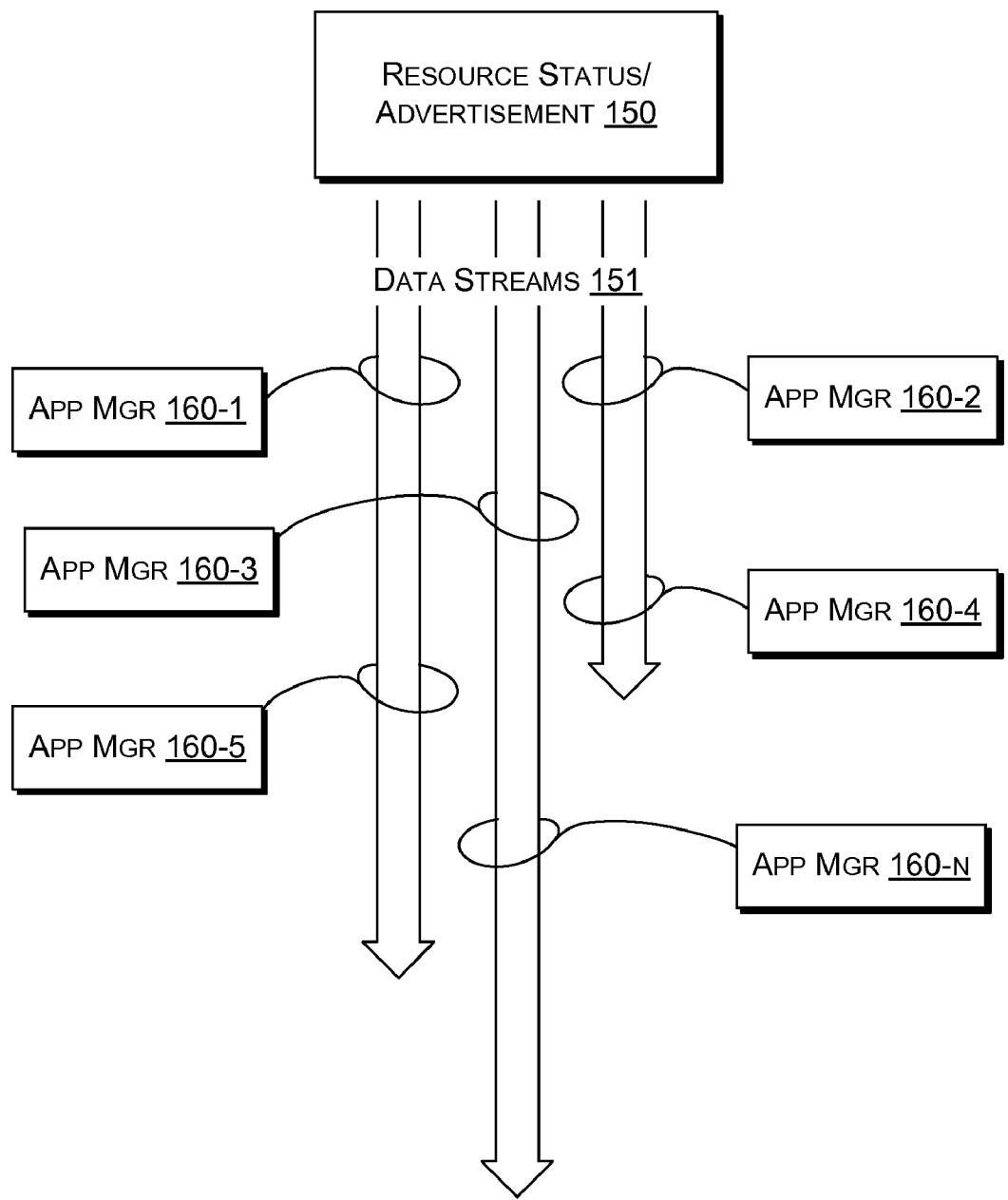
FIG. 3 is a diagram of an exemplary technique that streams certain data for consumption by application managers and for use by such managers when making requests for resources.

FIG. 3 shows the resource status/advertisement component 150 along with various data streams 151 being consumed by a plurality of manager components of disparate web-based applications 160. The arrangement of FIG. 3 serves to illustrate how various consumers can interact with one of data streams 151. As mentioned, subscribers to a data streaming service may be tiered. In such a system, one data stream may provide information to lower-tier subscribers (e.g., basic information) while another data stream may provide information to higher-tier subscribers (e.g., rich pricing information). Hence, in the example of FIG. 3, the three streams may optionally stream data based on subscriber level (e.g., subscriber tier).

As described herein, an exemplary data stream may be output by a computing device via the Internet (or other network such as an intranet) and include information about global computing resources accessible via the Internet where the information includes value information for use by consumers of global computing resources in making requests for global computing resources. Such consumers may be computing devices operated automatically for or by managers of web-based services or web-based applications accessible via the Internet. With respect to the computing device, it may include an algorithm to estimate value information based at least in part on data acquired from the global computing resources. A data stream may include memory information, CPU information and bandwidth information about the global computing resources and associated value information. A data stream may include geographic information about the global computing resources. A data stream may include information as to routing (e.g., how traffic is being directed in a "cloud" of global computing resources).

As described herein, an exemplary method includes receiving information from one or more data centers (e.g., information about data center resources); based at least in part on the information, estimating value information for consumption of computing resources of the one or more data centers; and streaming the value information via a network. Such a method can include estimating relative pricing for consumption of the data center computing resources. Such a method may stream the value information to potential consumers of the computing resources. Such a method can include receiving subscriptions from potential consumers of the computing resources. Accordingly, potential consumers may be subscribers to a data streaming service that performs the streaming.

Figure 4:
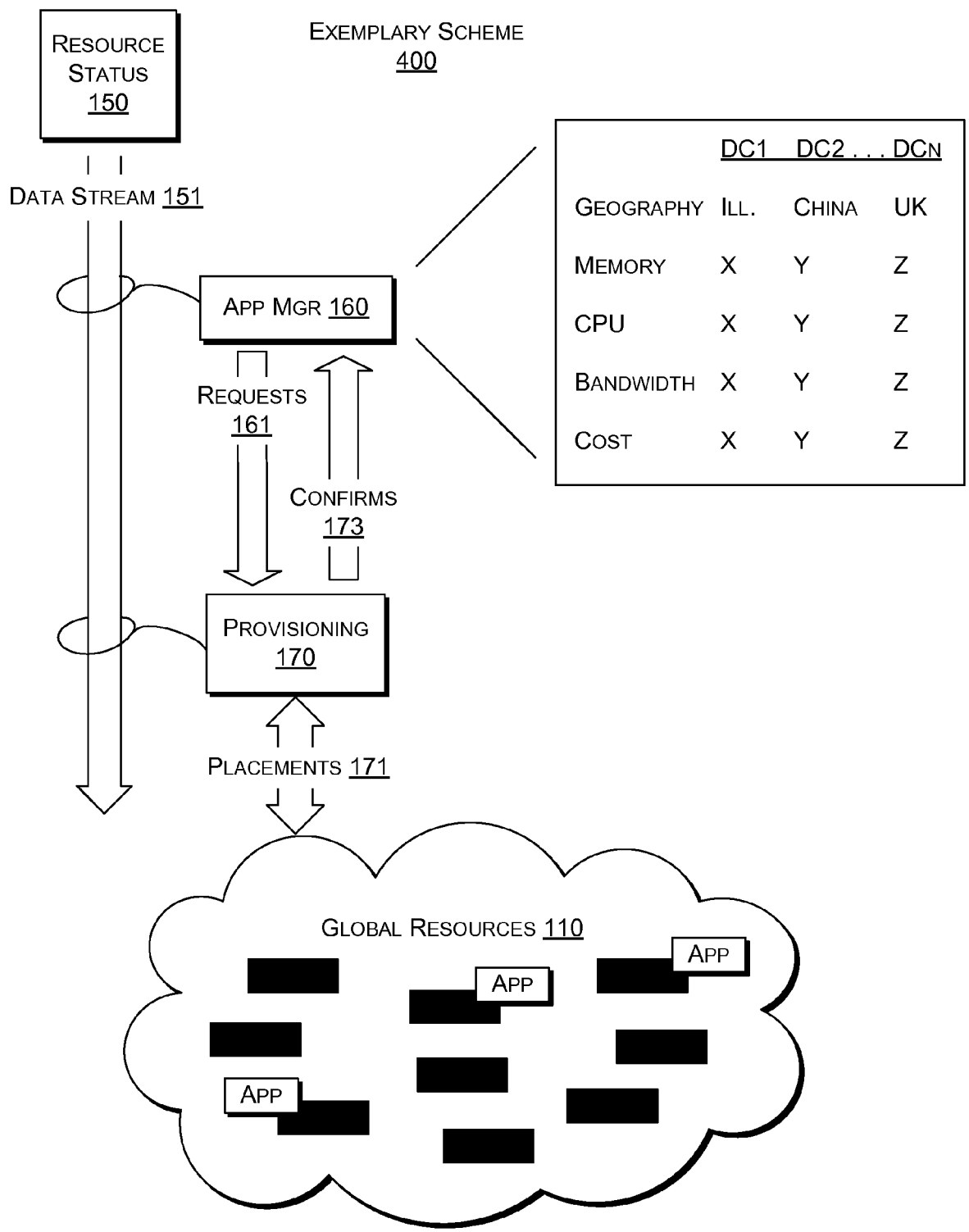
FIG. 4 is a diagram of an exemplary technique for monitoring a data stream, making requests for resources and provisioning resources.

FIG. 4 shows an exemplary scheme 400 whereby a consumer 160 consumes information about resources embodied in a data stream 151 and then makes requests for one or more resources based in part on the consumed information. As explained, the consumer 160 may be a computing device that operates automatically (e.g., according to some algorithm or pre-set limits) or that is operated by a manager or buyer. A box shows information that may be streamed as being organized with respect to various data centers. For example, for each of the data centers, the data stream 151 includes geographical information, memory information, CPU information, bandwidth and route information and cost information. The consumer 160 (e.g., an application manager) may make requests 161 to a provisioning mechanism 170 based at least in part on the information in the data stream 151. In turn, the provisioning mechanism 170 can make placements 171 for global resources 110 and issues confirmations 173 to the requesting consumer 160 when the requests 161 are met by corresponding placements 171. For example, the global resources 110 includes filled boxes that represent resources such as data centers where some of them have associated boxes labeled "App", which corresponds to the web-based application managed by the consumer 160. Further, the provisioning mechanism 170 may have access to the data stream 151 to perform sanity checks or other tasks related to requests 161, placements 171 and/or confirmations 173.

Figure 5:
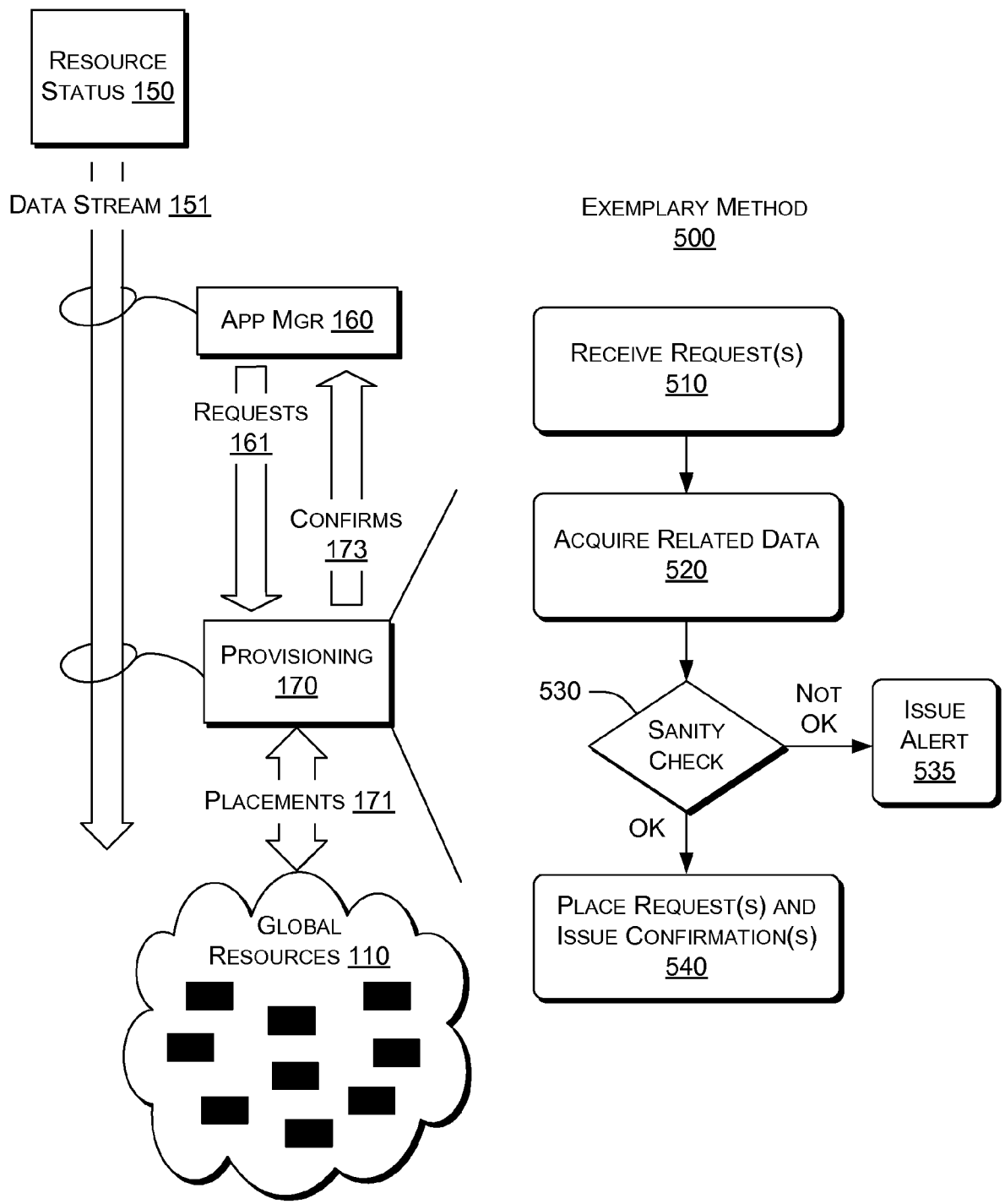
FIG. 5 is a diagram of an exemplary method for provisioning resources in response to a request.

FIG. 5 shows an exemplary method 500 in relationship to the exemplary scheme 400 of FIG. 4. Specifically, the method 500 performs a sanity check on a request(s) to help ensure accuracy and/or validity of the request(s) prior to placing the request(s) (e.g., a placement or placements). The method 500 commences in a reception block 510 that receives one or more requests from the consumer 160. The method 500 then enters an acquisition block 520 that acquires data related to the one or more requests. While the scheme 400 shows the provisioning mechanism 170 acquiring data from the same data stream 151 as the consumer 160, in an alternative example, the service 120 may provide a special data stream for use by the provisioning mechanism 170. For example, the special data stream may include information about consumers and associated limits on resource demands by such consumers. In such a scheme, the provisioning mechanism 170 may deny a request from a consumer where it exceeds a limit set upon the consumer's subscription to the service 120.

Referring again to the method 500, a sanity check block 530 performs a sanity check on each of the one or more received requests based in part on the acquired related data. If the sanity check decides that a particular request is sane (i.e., OK), then the method 500 continues to a placement block 540 where it places the request (e.g., a placement 171) and issues a confirmation 173. The sanity check block 530 may act on a series of requests iteratively and the method 500 may include logic that prevents placement of all requests if one request is found to be suspect or not sane. In the instance that the sanity check block 530 finds a request not sane (i.e., Not OK), then the method 500 enters an issuance block 535 that issues an alert. Such an alert may be a "request declined" alert to consumer 160 and issued by the provisioning mechanism 170 in a manner akin to the confirmation 173.

As described herein, an alert is typically issued to the consumer 160 but may also be issued to the service 120 and kept on record and optionally streamed to the provisioning mechanism 170 to notify the provisioning mechanism 170 of the consumer's history as to bad requests. In an alternative scheme, the provisioning mechanism 170 that issued the alert may record the incident and use the record for making future decisions about the requesting consumer and/or the type of request that generated the alert.

Figure 6:
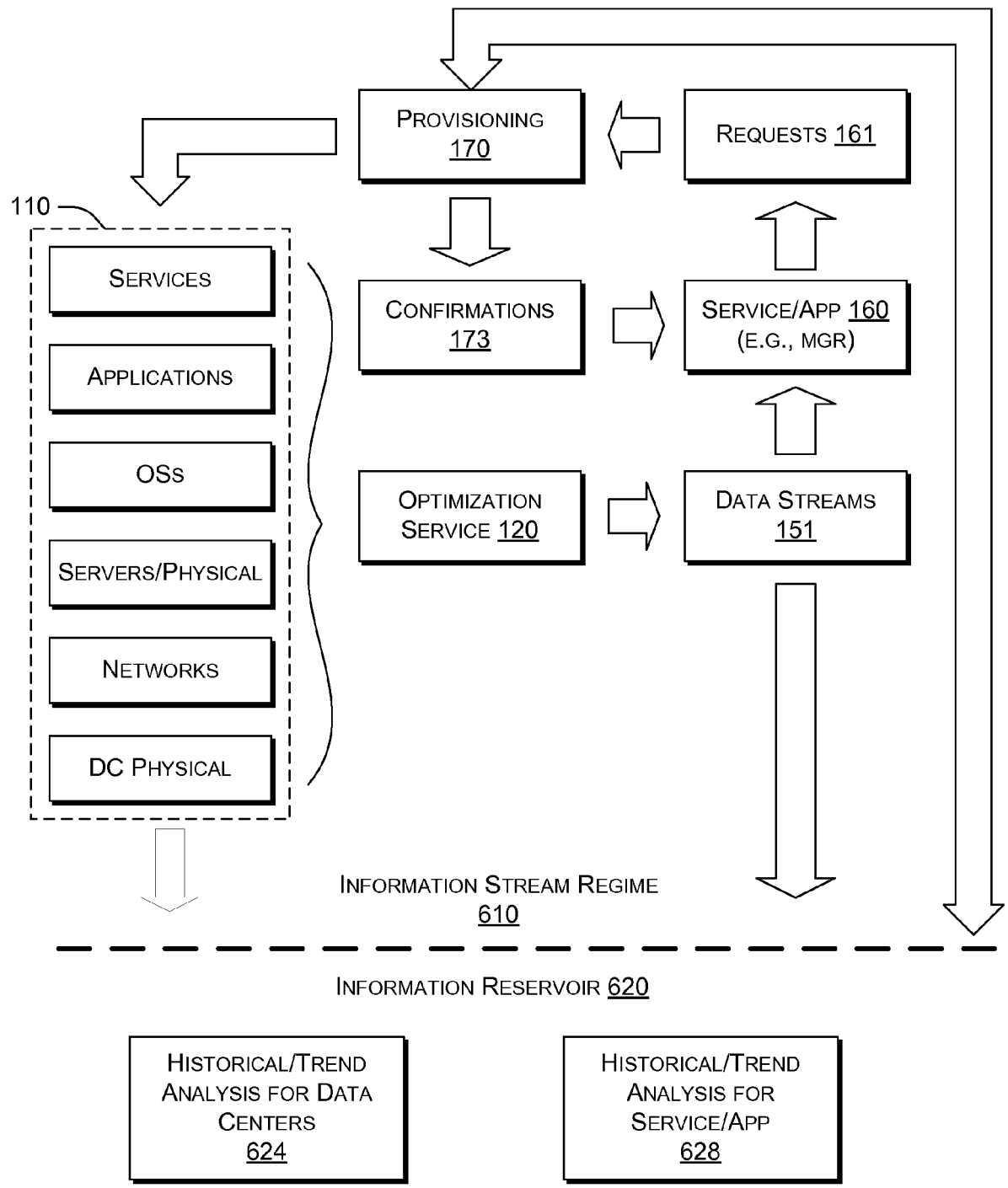
FIG. 6 is a diagram of an exemplary system that streams information and that also includes an information reservoir.

FIG. 6 shows various aspects of a real-time streaming, requesting and feedback system 600. Various features such as 110, 120, 151, 160, 161, 170 and 173 have already been described. The exemplary system 600 of FIG. 6 further illustrates an information stream regime 610 and an information reservoir 620. In particular, the optimization service 120 is an active service that streams information in one or more data streams 151 much like a stock ticker that streams equity prices for one or more stock markets. In contrast, historical data may be stored in the information reservoir 620. The analogy to stock information is helpful in describing the system 600. For example, a person making a decision to purchase shares of a traded company may examine real-time trading data and historical data to arrive at a decision. As mentioned, to date, for the realm of global computing resources, the real-time data is not readily available or actionable. As described herein, an exemplary system provides real-time or near real-time data about global computing resources and provides a mechanism for a consumer to act on such information to acquire or purchase resources. Per the system of FIG. 6, the service 120, the consumer 160, the provisioning mechanism 170, etc., may also have access to the information reservoir 620.

In the example of FIG. 6, a historical/trend analysis module for data centers 624 and a historical/trend analysis module for web-based services and applications 628 may be available for analyzing information in the information reservoir 620. As indicated, the information reservoir 620 may be repository for the raw information from the global resources 110, from the service 120 and/or from the provisioning mechanism 170.

Figure 7:
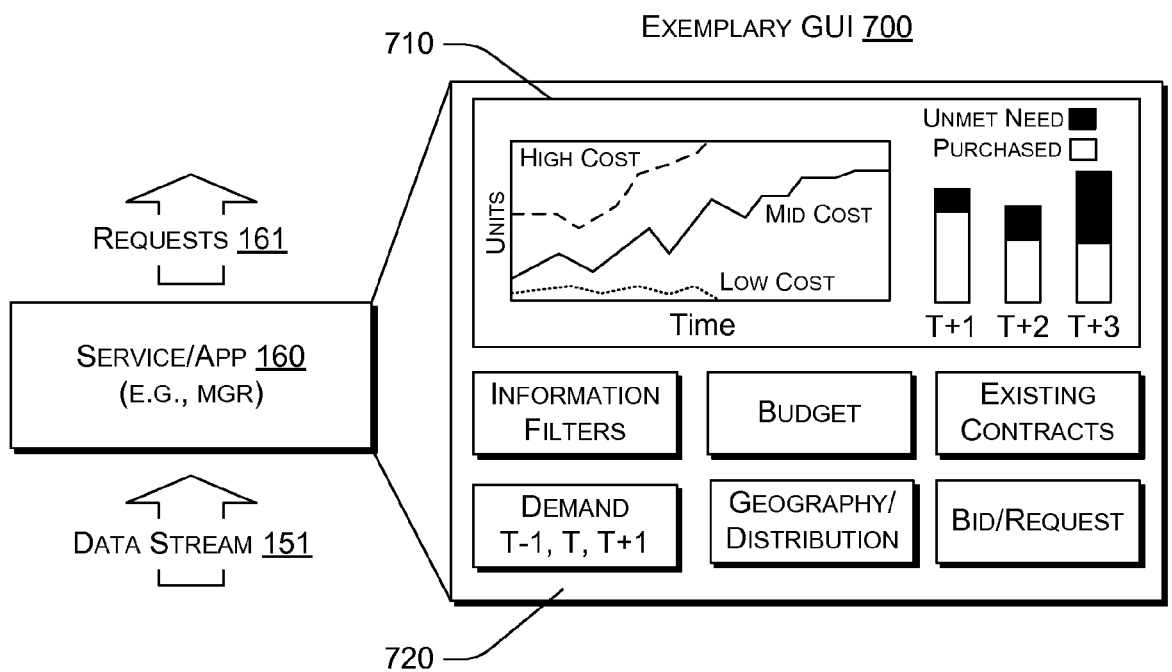
FIG. 7 is a diagram of an exemplary graphical user interface (GUI) for use by a service or application manager to consume a data stream and to make requests based in part on information in the data stream.

FIG. 7 shows an exemplary graphical user interface (GUI) 700 for use by a consumer 160 (e.g., an automatically or manually operated computing device for a manager of a web-based service or application). As mentioned, the consumer 160 consumes a data stream 151 emitted by a data streaming service 120 where the data stream includes information about global resources. In turn, the consumer 160 can make requests for such resources based at least in part on the information in the data stream 151 (e.g., automatically or manually). The GUI 700 includes underlying control logic (e.g., software instructions) that allow for its display and functionality. The GUI 700 includes a graphics pane to display information as to cost of resources over time as well as information as to needs for running a web-based service or application. The GUI 700 also shows some options 720 that can be selected to, for example, filter information, determine or analyze a budget, view existing contracts (e.g., placements), ascertain current and/or future demand for the service or application, determine aspects of geography or distribution of service or application users and/or resources, and to make requests (e.g., bids). The GUI 700 of FIG. 7 is presented as an example as various aspects may be adapted or changed depending on specific needs of a consumer.

As described herein, one or more exemplary computer-readable media include computer-executable instructions to instruct a computing device to receive, from a data stream, value information for computing resources of one or more data centers, to format the value information for display and to issue requests for consumption of at least some of the computing resources. Such a medium or media may include instructions to login to a data streaming service that provides the data stream. Such a data stream may be received via the Internet. Such a medium or media may include instructions to receive confirmations for issued requests. Further, instructions may be included to access an information reservoir that comprises historical price information (see, e.g., reservoir 620 of FIG. 6).

Figure 8:
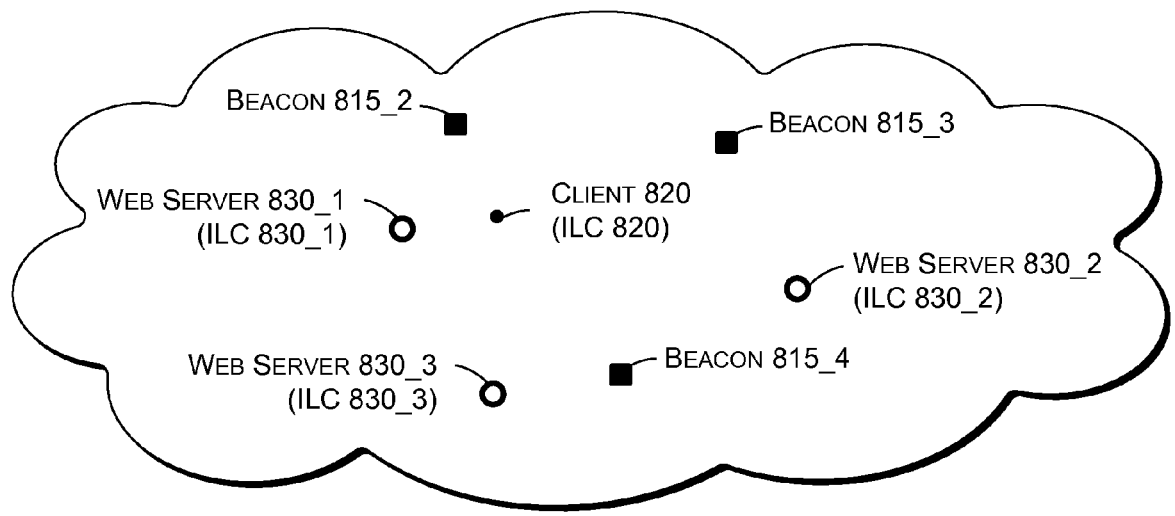
FIG. 8 is a diagram of an exemplary system for Traffic Management (TM) that relies on an Internet Location Coordinate (ILC) enhanced Domain Name System (DNS)
Figure 8:
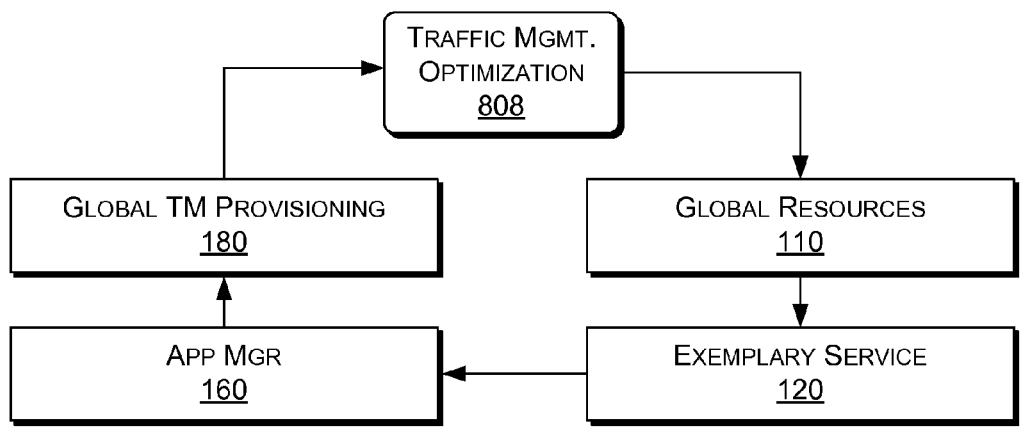

FIG. 8 shows an exemplary method 800 that includes a particular Traffic Management (TM) system. The method 800 refers to a client 820, which is a user of a web-based service or application. The client 820 may access one or more of the web servers 830_1, 830_2 and 830_3 (e.g., a redundant or geo-distributed arrangement) that are running the web-based service or application. The TM manages traffic based in part on beacons 815_2, 815_3 and 815_4.

In the method 800, an acquisition block 804 acquires information about the client 820 and the web servers 830_1, 830_2 and 830_3 in relationship to the three beacons 815_2, 815_3 and 815_4. In the example of FIG. 8, the information is round trip time (RTT), which serves as an indication of traffic congestion about a web server and is referred to as Internet Location Coordinate (ILC) information. An optimization block 808 determines the optimal web server as the web server 830_2 based on the acquired information. For example, the block 808 may use an exemplary algorithm that takes the absolute value of the difference between a beacon RTT for the client 820 and a corresponding beacon RTT for each web server. The algorithm adds the results and selects the web server with the smallest sum. Such an algorithm finds the web server in the "best" part of the network space compared to the client's position in the network space. Other algorithms may be used to compare ILCs.

While the example of FIG. 8 pertains to a travel time (or transmission time) based on a single packet to a beacon, an exemplary method may send a train of packets to a beacon. Accordingly, the packet train may be analyzed to provide a more accurate indication of travel time between the client and the beacon, and to incorporate congestion information.

As described herein, an ILC can represent latencies in a network. As latencies may change over time, an ILC may be updated. For example, as peak usage nears, a participant may see its respective beacon RTTs increase; whereas, during non-peak (e.g., late night, early morning, holidays, etc.), the participant may see its respective beacon RTTs decrease.

An exemplary ILC may include information such as a time of "measurement" for a tuple received in response to a DNS request. Such information may be generated upon transmission of a packet or upon receipt of a packet. An exemplary method records a RTT for a beacon along with a "freshness" time; where a stale time may indicate a problem with a participant.

In various examples, participants may rely on the same set of beacons. In other examples, the beacons for a client and a web server or group of web servers associated with a domain name may differ. In such circumstances, additional information about the beacons may be used in selecting the best participant amongst a group of participants.

Referring again to the method 800 of FIG. 8, decisions made by the block 808 impact the global resources 110, which, in turn, affects the information streamed by the service 120. Further, a request by a consumer 160 can be received and accounted for by the TM provisioning mechanism 180. Actions by the mechanism 180 can then be accounted for by the TM optimization 808. In an alternative arrangement, the TM provisioning mechanism 180 includes features to perform the method 800 (e.g., actions of the acquisition block 804 and the optimization block 808).

Figure 9:
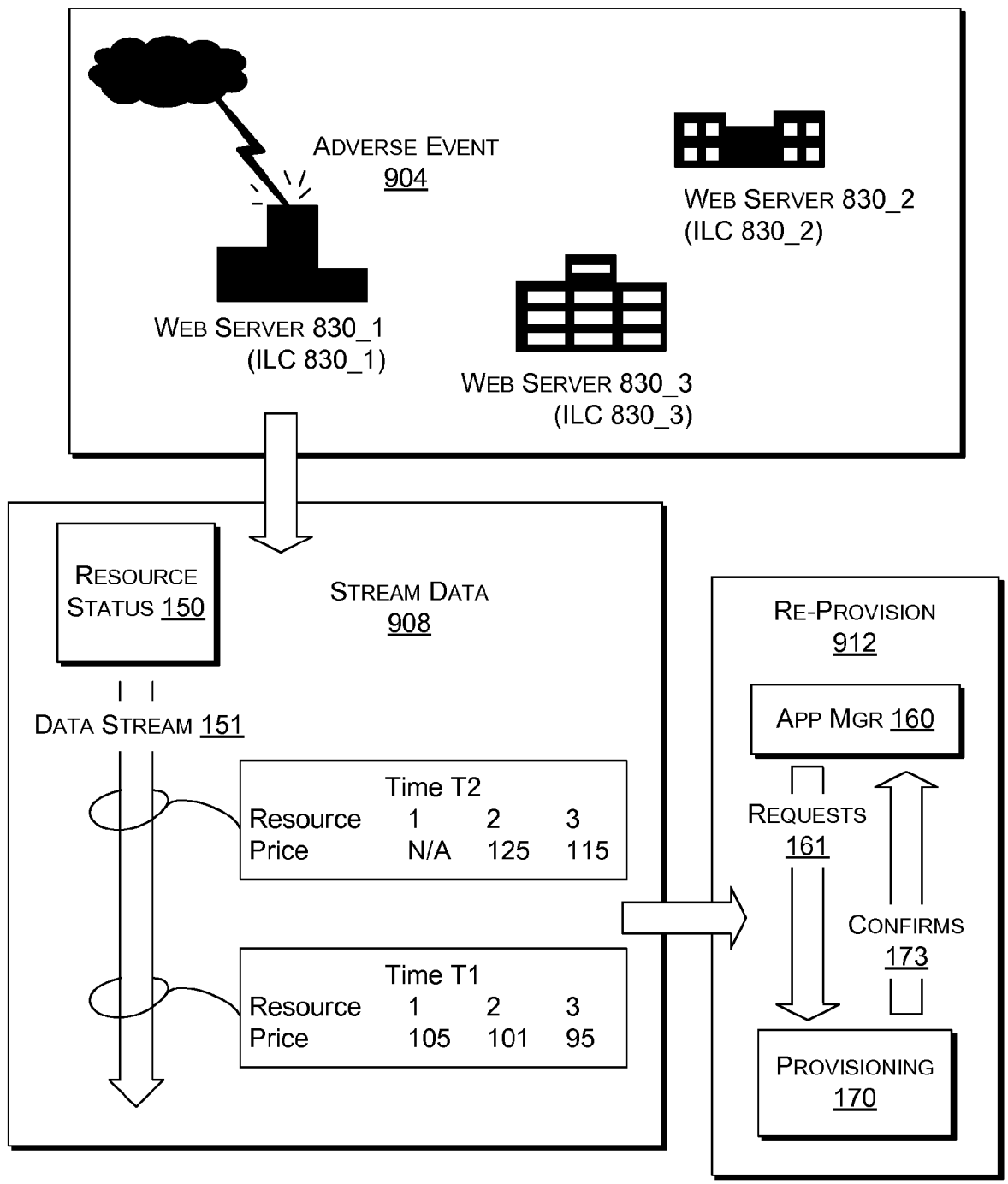
FIG. 9 is a diagram of an exemplary method that responds to an adverse event that effects one or more resources.

FIG. 9 shows an exemplary method 900 that pertains to an adverse event that occurs after a time T1. As shown, an adverse event 904 impacts a resource (i.e., web server 830_1) of the system of global resources. When the web server 830_1 goes down, the service 120 can note this event via acquiring news data, an emergency signal, etc. For example, such a signal may be a manual or automatically generated signal or communication and may allow for influencing the market to thereby facilitate resource maintenance or to reduce market impact prior to taking one or more resources off-line (e.g., pricing a resource artificially high can tail demand for the resource). In turn, the service 120 outputs via the resource status/advertisement component 150 a data stream 151 that reflects the adverse event. Specifically, price information for a time T1 (prior to event) and T2 (after the event) for three resources (e.g., web servers 830_1, 830_2 and 830_3) is shown as being included in the data stream 151. At time T1, the prices of the web servers 830_1, 830_2 and 830_3 are within a range of 95 to 105. At time T2, web server 830_1 is not available (N/A) and the prices of the web servers 830_2 and 830_3 has increased from 101 to 125 and from 95 to 115, respectively. For example, according to supply and demand, as the web server 830_1 experiences an adverse event that takes it off line, the service 120 can provide a data stream 151 for consumers 160 to assist in decision making as to resource acquisition. As mentioned, artificial pricing can also be used to direct resource provisioning away from certain resources and toward other resources (e.g., web server 830_1 may be assigned an excessively high price while web servers 830_1 and 830_2 may be assigned lesser or discounted prices).

Further, as shown in the method 900, the information may be used in a re-provisioning block 912 to re-provision existing placements that can no longer be fulfilled as the web server 830_1 is off line. In such situations, fall back or other policies may be implemented to smooth costs for a manager having a pre-existing placement that can no longer be fulfilled. In a particular scheme, the consumer 160 may acquire more expensive resources and then demand compensation from the operators of the failed system.

As described herein, various exemplary techniques can help make the market for data center and related resources more efficient. Current practice relies on a data store or data reservoir where data may be quite stale (i.e., outdated). In contrast, an exemplary system provides one or more real-time data streams, for example, akin to a stock ticker feed or news feed. Such a feed can include information pertaining to data center operation, even including scheduled events, weather, etc. In a variation, a specialized data stream for management of one or more data center and/or one or more other resources may be provided with or without information such as price (e.g., depending on management needs). In this variation, a manager may monitor a specialized data stream for any of a variety of purposes, including upgrading equipment or software, maintaining hardware or infrastructure, etc.

An exemplary data streaming service can include an optimization algorithm to analyze information (e.g., raw data) and to output meaningful data to managers of applications/services—including prices/costs. In turn, the managers can make requests. A provisioning mechanism can provision resources based on requests and forms part of a feedback loop. Overall, the flow of information allows for decision making by app/service managers and developers and drives market efficiency.

Figure 10:
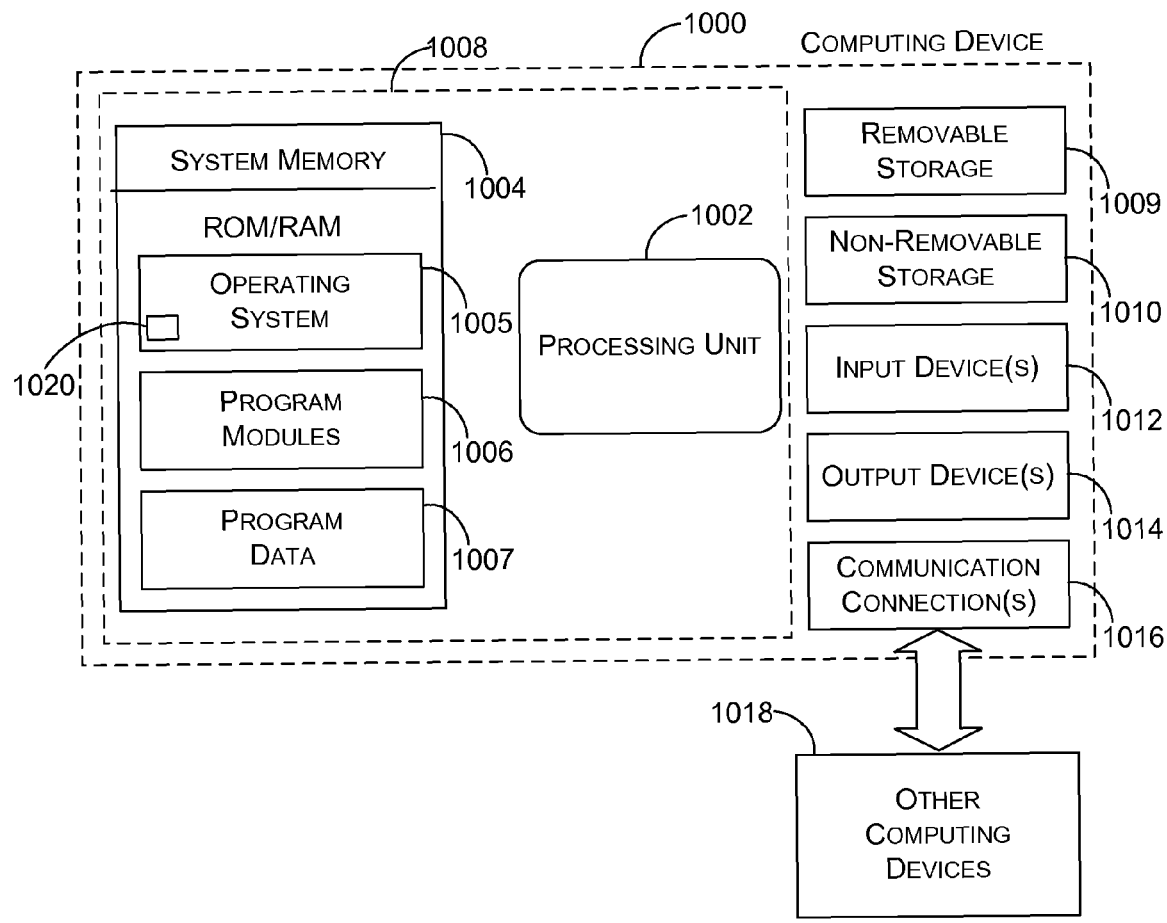
FIG. 10 is a block diagram of an exemplary computing device.

FIG. 10 illustrates an exemplary computing device 1000 that may be used to implement various exemplary components and in forming an exemplary system. For example, the clients 820 or the servers 830 of the system of FIG. 8 may include various features of the device 1000. Such a device may be configured to perform tasks of the service 120, the consumer 160, the provisioning 170, etc. Such a device may be configured to display the GUI 700 of FIG. 7 and its associated functionality.

In a very basic configuration, computing device 1000 typically includes at least one processing unit 1002 and system memory 1004. Depending on the exact configuration and type of computing device, system memory 1004 may be volatile (such as RAM), non-volatile (such as ROM, flash memory, etc.) or some combination of the two. System memory 1004 typically includes an operating system 1005, one or more program modules 1006, and may include program data 1007. The operating system 1005 include a component-based framework 1020 that supports components (including properties and events), objects, inheritance, polymorphism, reflection, and provides an object-oriented component-based application programming interface (API), such as that of the .NET™ Framework marketed by Microsoft Corporation, Redmond, Wash. The device 1000 is of a very basic configuration demarcated by a dashed line 1008. Again, a terminal may have fewer components but will interact with a computing device that may have such a basic configuration.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of device 1000. Computing device 1000 may also have input device(s) 1012 such as keyboard, mouse, pen, voice input device, touch input device, etc. Output device(s) 1014 such as a display, speakers, printer, etc. may also be included. These devices are well known in the art and need not be discussed at length here.

Computing device 1000 may also contain communication connections 1016 that allow the device to communicate with other computing devices 1018, such as over a network. Communication connections 1016 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

While a general computing device is shown in FIG. 10, other equipment may be configured to perform one or more actions of the exemplary methods described herein. For example, a network device may be configured to perform one or more actions such as streaming data, acquiring data, issuing alerts, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   streaming, via a network, information that advertises global computing resources that are accessible via the network, the streamed information comprising at least one of past, present or future value information for use by consumers that make requests for one or more of the global computing resources;

providing, by a consumer, a request for one or more of the global computing resources;

modifying the streamed information based at least in part on the request;

acquiring Internet Location Coordinate (ILC) information regarding the consumer and at least one provider of the global computing resources associated with the request; and determining at least one optimal provider based on the ILC information.

2. The method of claim 1, wherein the consumers comprise computing devices of managers of web-based services or web-based applications accessible via the network and the streamed information includes an availability and a quantity of the global computing resources.

3. The method of claim 1, further comprising estimating value information based at least in part on data acquired from at least one source of the global computing resources, the value information including pricing information.

4. The method of claim 1, wherein the streamed information further comprises memory information and CPU information about the global computing resources.

5. The method of claim 1, wherein the streamed information further comprises geographic information about the global computing resources.

6. The method of claim 1, wherein the streamed information further comprises network bandwidth information about the global computing resources.

7. One or more computer-readable recordable storage media having instructions stored thereon, that when executed by a processor of a computing device, perform operations comprising:

receiving information about data center resources from one or more data centers;

estimating value information for consumption of computing resources of the one or more data centers, the value information indicating a value of one or more of the computing resources;

streaming information, via a network, advertising the computing resources to consumers of computing resources, the streamed information including the value information, the streamed information being modified based at least in part on consumption of at least some of the computing resources;

acquiring Internet Location Coordinate (ILC) information regarding a consumer and the one or more data centers; and determining a best of the one or more data centers to provide a computing resource to the consumer based at least in part on the ILC information.

8. The one or more computer-readable recordable storage media of claim 7, wherein the estimating comprises estimating relative pricing for consumption of the computing resources.

9. The one or more computer-readable recordable storage media of claim 7, further comprising receiving subscriptions from potential consumers of the computing resources.

10. The one or more computer-readable recordable storage media of claim 7, wherein the streaming streams the value information to potential consumers of the computing resources.

11. The one or more computer-readable recordable storage media of claim 10, wherein the potential consumers comprise subscribers to a data streaming service that performs the streaming.

12. The one or more computer-readable recordable storage media of claim 7, wherein the computing resources comprise memory and CPU resources.

13. The one or more computer-readable recordable storage media of claim 7, wherein the computing resources comprise bandwidth resources.

* * * * *